Figure 1:
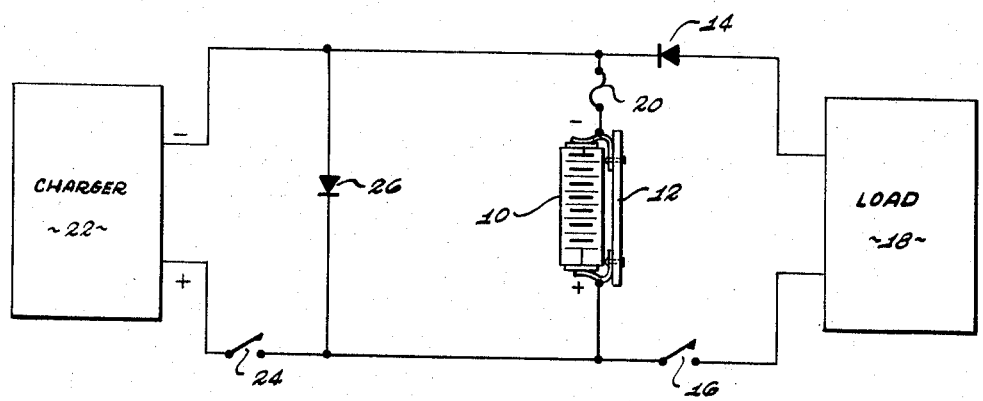

April 11, 1967 W. H. BACH ET AL 3,313,995
REVERSE POLARITY PROTECTION CIRCUIT
Filed Jan. 16, 1964

INVENTORS
WALTER H. BACH
GERHARD H. KOESTER
BY Fulwider, Patton, Rieber,
Lee, and Utecht
ATTORNEYS

United States Patent Office 3,313,995
Patented Apr. 11, 1967

3,313,995
REVERSE POLARITY PROTECTION CIRCUIT
Walter H. Bach, Los Angeles, and Gerhard H. Koester, Pacific Palisades, Calif., assignors to Bach Auricon, Inc., Los Angeles, Calif., a corporation of California
Filed Jan. 16, 1964, Ser. No. 338,168
5 Claims. (Cl. 320—25)

This invention relates generally to electrical safety circuits, and more particularly to improvements in electrical circuitry for protecting batteries and the electrical systems they supply against the consequences of battery reversal.

In recent years, it has become a common practice to design portable electrical equipment, e.g., of the video or photographic types, so that such units are capable of battery operation wherever or whenever conventionally generated sources of electrical power are unavailable. In the interests of economy, such portable electrical devices are usually designed to use batteries of the rechargable variety, such as Edison cells, nickel-cadmium batteries and the like, although such devices may also be designed to operate from non-rechargeable batteries having a long shelf life, such as mercury cells. Frequently, the equipment is also designed so that the battery need not be removed from the equipment for the recharging process and, in such instances, the equipment either directly incorporates a battery charging unit of its own or is adapted for easy connection to an appropriate external charging unit.

Unfortunately, rechargeable batteries, as well as some non-rechargeable batteries such as mercury cells, are subject to battery breakdown, explosion, or both, when a voltage is applied from a charger or other source of electrical potential tending to drive such batteries backwards. Aside from destruction of the battery itself, the possibility of explosion presents obvious additional hazards to both equipment and operating personnel. Hence, workers in the electrical arts have long recognized the need for simple, economical and essentially fail-safe means for preventing the inadvertent application of reverse driving potentials to batteries subject to the aforedescribed difficulty. The present invention fulfills this need.

Accordingly, it is an object of the present invention to provide an electrical protection system which overcomes the above and other difficulties encountered by the prior art.

Another object is to provide new and improved means for preventing a battery from being driven backwards.

A further object of this invention is the provision of means for automatically disabling the circuitry supplying electrical power to a battery whenever the battery is installed in a reverse polarity configuration.

Still another object is to provide a novel electrical safety circuit whereby reverse polarity installation of a battery into a system automatically breaks the electrical connection between the battery and the remainder of the system.

Yet another object of the present invention is the provision of relatively simple yet reliable means for preventing a battery which has been inadvertently installed in a reverse polarity configuration from being driven backwards and/or damaging the electrical load supplied by the battery.

Figure 2:
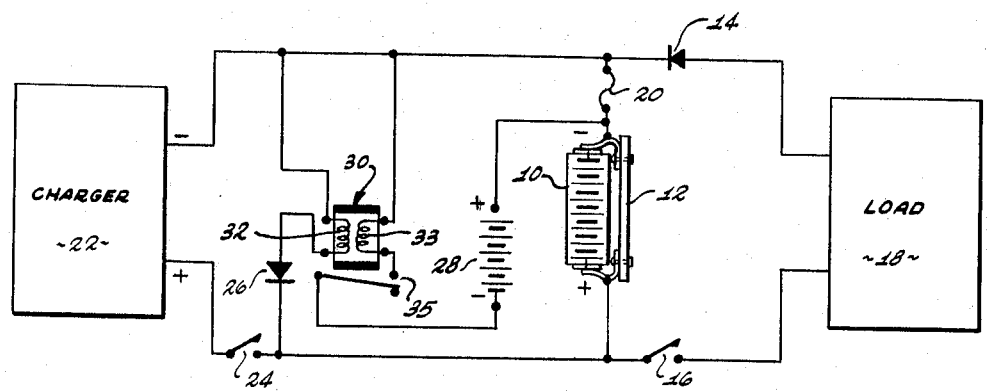

The above and other objects and advantages of this invention will be better understood by reference to the following detailed description, when considered in connection with the accompanying drawing of illustrative embodiments thereof, and wherein:

FIGURE 1 is an electrical schematic diagram of one embodiment of an electrical protection circuit in accordance with the present invention; and FIGURE 2 is an electrical schematic diagram illustrating another embodiment of an electrical protection circuit in accordance with the invention.

Referring now to the drawing, and particularly to FIGURE 1 thereof, a battery 10 is removably mounted within an appropriate battery receptacle 12 which is, in turn, electrically connected through a diode 14 and switch 16 to an electrical load 18. The electrical load 18 may be any electrical device capable of being powered by the battery 10, such as a motor, light source, amplifier or other electronic device.

As observed in FIGURE 1, the battery receptacle 12 can receive the battery 10 in either of two polarity configurations, i.e., with the battery polarities as indicated adjacent the receptacle in FIGURE 1 or with the battery reversed (polarities as shown in parentheses). In those instances where the electrical load 18 might be subject to damage if reverse biased or driven backwards, it becomes extremely important to insure that the battery 10 is installed within the receptacle 12 in the proper polarity configuration for satisfying the requirements of the load. In this regard, the diode 14 in series with the electrical load 18 functions as a blocking diode to permit only the prescribed unidirectional flow of electrical current through the load. The switch 16 is a power on-off switch of conventional design for selectively feeding power to the load 18 from the battery 10.

A fuse 20 is also included in series with the battery 10 to protect both the battery and the load against short circuiting.

A battery charger 22 is connected through the fuse 20 and a conventional on-off charger switch 24 so that it shunts the battery 10 and is thereby adapted to selectively charge the battery whenever the battery has dissipated its power through the load 18.

A diode 26 is connected in parallel with the battery 10 and fuse 20 so that the diode is reverse biased by the battery when the battery is installed in its proper polarity configuration shown in FIGURE 1. Hence, the diode 26 also functions as a blocking diode, and no current can flow from the battery 10 through the shunt path containing the diode 26 unless the polarity of the driving potential is reversed.

As previously indicated, it is extremely desirable to prevent the battery 10 from being driven backwards in order to avoid complete battery breakdown or, even worse, an explosion from occurring. Although the exact nature of such explosions has not yet been fully determined, it is believed that reverse charging of certain types of batteries results in an exothermal chemical reaction which causes the moisture in the battery to be converted to steam, the pressure build-up of the latter within a sealed battery casing ultimately resulting in an explosion.

The manner in which the electrical circuit of FIGURE 1 operates to protect the battery 10 and other portions of the system for damage due to inadvertent installation of the battery in a reverse polarity configuration is next described. Referring again to FIGURE 1, assume that the battery 10 has been installed backwards in the battery receptacle 12, so that the polarity configuration is as indicated in parentheses. With the battery thus installed, the diode 26 is forward biased to conduction, and the battery 10 will be short circuited. As soon as the latter occurs, the fuse 20 in series with the battery will burn out and thus open the circuit between the battery and the remainder of the electrical system.

In the event the energy of the battery 10 has been completely dissipated by the electrical load 18, and the battery is ready to be recharged by the charger 22, the system will still operate in the aforedescribed manner if the battery is reversed, assuming the fuse 20 is not too large. The reason for this is that even dissipated batteries of the rechargeable type have sufficient residual potential to provide a brief but high intensity current pulse upon being short circuited. Therefore, such rechargeable batteries will usually also blow a small fuse 20 when they are installed backwards, even though they have been completely discharged.

Since the fuse 20 must be of sufficient size to pass normal load currents as well as battery charging currents without burning out, it sometimes occurs that the residual short circuit current of the battery 10 cannot be depended upon to burn out the fuse 20 and thereby disconnect the battery from the electrical system. Under these conditions, the embodiment of the invention shown in FIGURE 2 may be used. In this connection, the elements 10–26 in the circuit of FIGURE 2 correspond to the elements designated by like numerals in the embodiment of the invention shown in FIGURE 1.

Referring to FIGURE 2, it will be observed that a booster battery 28 and a sensitive latching relay 30 have been added to the electrical protection circuit of FIGURE 1. The latching relay 30 includes a pair of energizing coils 32, 33 and a pair of normally open relay switch contacts 35. The energizing coil 32 of the relay 30 is connected in series with the diode 26. The energizing coil 33 and contacts 35 of the relay 30 are connected in series with the booster battery 28, and together provide a shunt path around the fuse 20. The booster battery 28 is preferably a battery having a long shelflike, such, as a mercury cell or the like and is connected into the circuit so that the flow of current from the booster battery through the fuse 20 will aid rather than buck the residual short circuit current of the battery 10 when the latter is installed in a reverse polarity configuration.

It will be apparent in FIGURE 2 that, when the battery 10 is reversed, the diode 26 will be forward biased by the residual potential of the battery, and electrical current will flow from the battery 10 through the fuse 20, the diode 26 and the energizing coil 32 of the sensitive latching relay 30. The passage of current through the coil 32 causes the switch contacts 35 of the relay 30 to close, and thus connects the booster battery 28 in parallel with the fuse 20. Electrical current then flows from the booster battery 28 through the fuse 20 and the coil 33 of the relay 30, so that the switch contacts 35 of the relay remain closed even though no additional current may be flowing from the battery 10 through the energizing coil 32 of the relay.

Within a brief interval of time after the booster battery 28 is connected into the circuit, the short circuit current from the booster battery will cause the fuse 20 to burn out and disconnect both the battery 10 and the booster battery from the remainder of the electrical system. In this manner, the reverse polarity installation of the battery 10 in the receptacle 12 automatically disables the electrical system so that the battery cannot be driven backwards.

It will be apparent from the foregoing that, while particular forms of our invention have been illustrated and described, various modifications can be made without departing from the spirit and scope of our invention. Accordingly, we do not intend that our invention be limited, except as by the appended claims.

We claim:

1. An electrical system, comprising:
receptacle means for removably connecting a battery into an electrical system;
a fuse electrically connected in series with said receptacle means;
a unidirectional electrical path in parallel with said fuse and said receptacle means;
a booster battery;
normally disabled means for electrically connecting said booster battery across said fuse;
and means responsive to flow of electrical current through said unidirectional electrical path to enable said normally disabled means, whereby electrical current from said booster battery causes said fuse to burn out.

2. Electrical apparatus, comprising:
a contact receptacle for removably connecting a battery into an electrical system;
current responsive disabling means in series with a diode and together providing a shunt path around said contact receptacle, said diode being forward-biased to conduction only by reverse polarity installation of a battery into said contact receptacle;
a booster battery;
normally disabled means for electrically connecting said booster battery across said current responsive disabling means, said battery being connected to send current through said current responsive disabling means, in the same direction as current provided by a battery installed within said contact receptacle in a reverse polarity configuration;
and means responsive to flow of electrical current through said shunt path containing said diode to enable said normally disabled means, whereby said current responsive disabling means will disconnect said contact receptacle from the remainder of said electrical system.

3. An electrical protection circuit, comprising:
receptacle means for removably connecting a source of electrical power into an electrical system;
a latching relay having first and second energizing means and a pair of normally open switch contacts;
a fuse electrically connected in series with said receptacle means;
a booster source of electrical power connected in series with said first energizing means and said switch contacts and together providing a shunt path around said fuse;
and a diode electrically connected in series with said second energizing means and together defining a shunt path around said receptacle means and said fuse.

4. Electrical apparatus comprising:
receptacle means for removably connecting a battery into an electrical system in either normal or reverse polarity configurations;
a sensitive latching relay having first and second energizing means and a pair of normally open switch contacts;
current responsive disabling means connected in series with said receptacle means;
a booster battery electrically connected in series with said first energizing means and said switch contacts and together defining an electrical path in parallel with said disabling means, said booster battery being connected to send current through said disabling means in the same direction as current would pass through said disabling means when a battery is installed within said receptacle means in the reverse polarity configuration;
and a diode electrically connected in series with said second energizing means, said diode being adapted to be forward biased to conduction only when a battery is installed within said receptacle means in the reverse polarity configuration, whereby such installation of a battery into said receptacle means passes electrical current through said diode and said second energizing means to close said switch contacts and thereby cause said booster battery to direct additional current through said current responsive disabling means.

5. Apparatus for automatically disconnecting a battery upon reverse polarity installation of the battery into an electrical system, comprising:
- a contact receptacle for removably connecting a battery into an electrical system in either of two polarity configurations;
- a sensitive latching relay having first and second energizing coils and a pair of normally open switch contacts;
- a fuse electrically connected in series with said contact receptacle;
- a booster battery of the type having a long shelf life, said booster battery being electrically connected in series with said first energizing coil and said normally open switch contacts and together defining a shunt path around said fuse, said booster battery being adapted upon closing of said switch contacts to send electrical current through said fuse in the same direction as electrical current would pass through said fuse when a battery is installed within said contact receptacle in the reverse polarity configuration;
- and a diode electrically connected in series with said second energizing coil and together defining a shunt electrical path around said contact receptacle and said fuse, said diode adapted to be forward biased to conduction only by reverse polarity installation of a battery within said contact receptacle, whereupon flow of electrical current through said second energizing coil causes said normally open switch contacts to close and thereby permit current from said booster battery to burn out said fuse.

References Cited by the Examiner

UNITED STATES PATENTS

| | | | |
|---|---|---|---|
| 2,509,239 | 5/1950 | Mattheyes | 320—26 |
| 3,160,805 | 8/1964 | Lawson | 320—39 |

OTHER REFERENCES

Protective Circuit, A. Ruehli, IBM Technical Disclosure Bulletin, vol. 4, No. 9, February 1962, p. 66 relied on.

JOHN F. COUCH, *Primary Examiner.*

S. WEINBERG, *Assistant Examiner.*